June 28, 1955 — M. A. BLU — 2,711,917
METAL JOINT
Filed Feb. 16, 1953 — 2 Sheets-Sheet 1

Marshall A. Blu
INVENTOR.

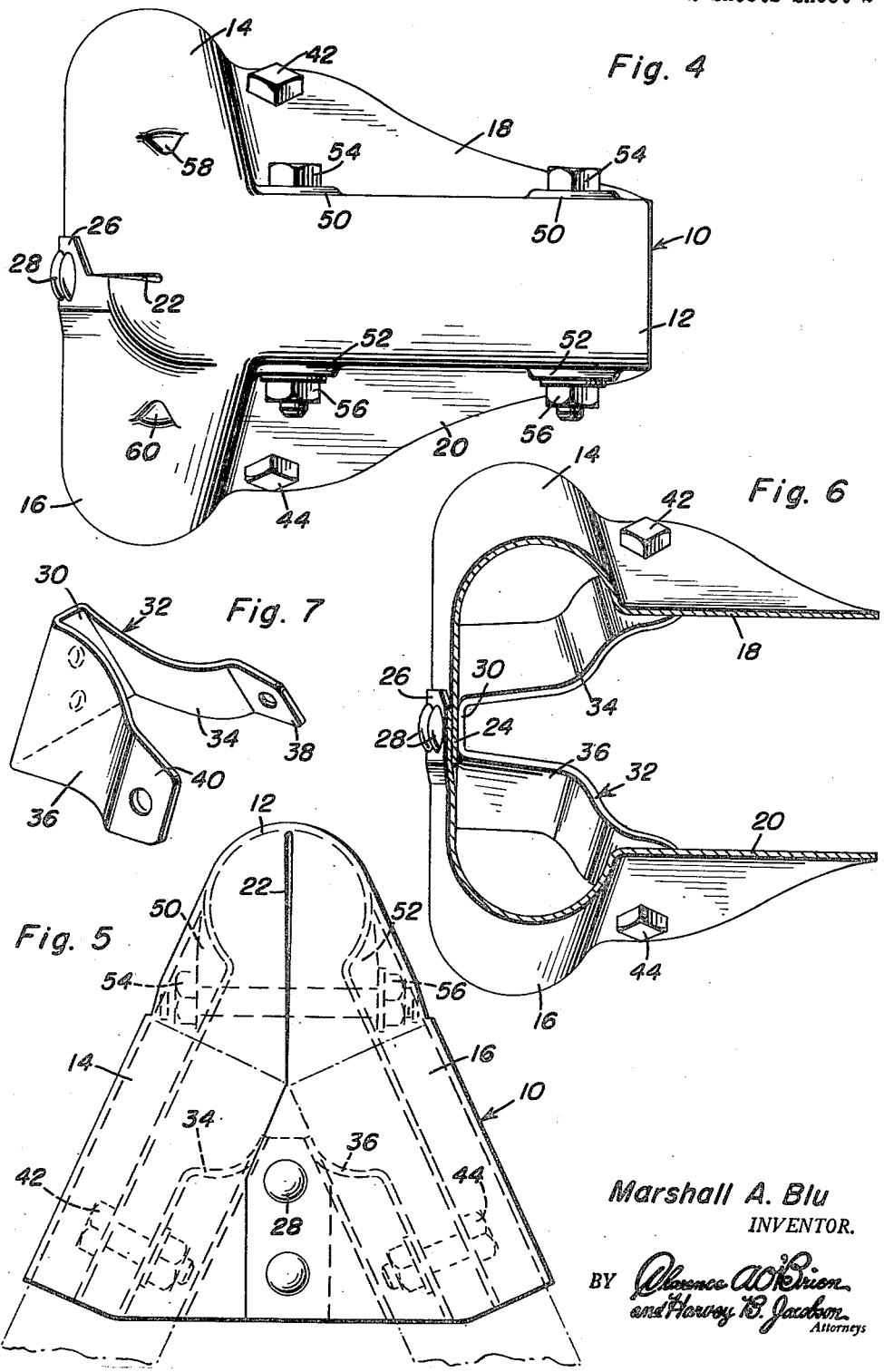

United States Patent Office 2,711,917
Patented June 28, 1955

2,711,917

METAL JOINT

Marshall A. Blu, Fort Lauderdale, Fla., assignor, by mesne assignments, to Sherry Corporation, Houston, Tex., a corporation of Texas Application February 16, 1953, Serial No. 336,951

2 Claims. (Cl. 287—54)

This invention relates to new and useful improvements in metallic joints and couplers and the primary object of the present invention is to provide a removable clamping joint for connecting and joining three elongated structural members.

Another important object of the present invention is to provide a metal joint composed of inner and outer clamping members that will be adjustably connected together for the purpose of clampingly engaging three structural members.

A further object of the present invention is to provide a metal joint wherein the inner and outer clamping members are formed from sheet metal that is bent in order to provide the necessary clamping surfaces for structural members joined by the present invention.

A still further aim of the present invention is to provide a metal joint of the aforementioned character that is extremely simple and practical in construction, strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refere to like parts throughout, and in which:

Figure 4 is a top plan view of Figure 3;

Figure 5 is a rear elevational view of Figure 3;

Figure 6 is a longitudinal horizontal sectional view taken substantially on the plane of section line 6—6 of Figure 3; and Figure 7 is a perspective view of the inner clamping member used in conjunction with the present invention.

Figure 1:
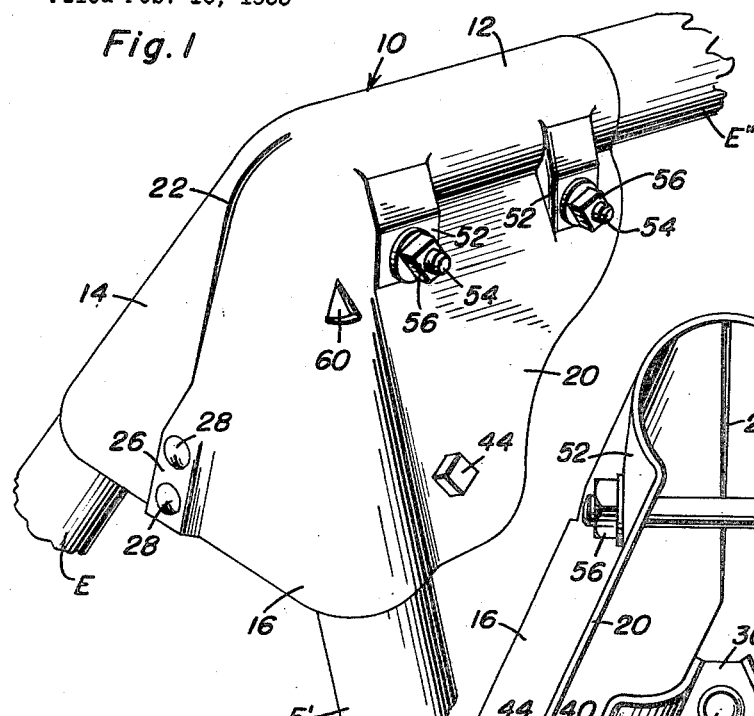
Figure 1 is a perspective view showing the present invention in use for joining three structural members of a frame structure.
Figure 2:
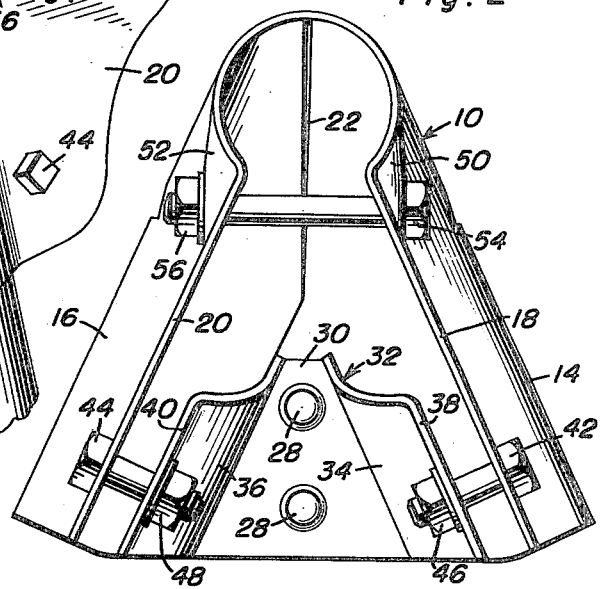
Figure 2 is an end elevational view of the present invention looking into the interior thereof.
Figure 3:
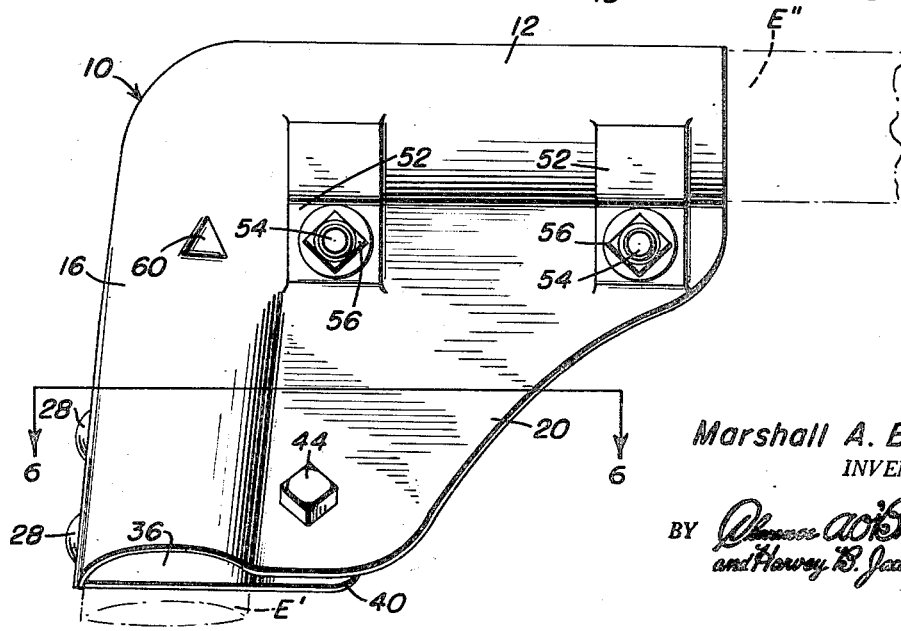
Figure 3 is a side elevational view of Figure 2.

Referring now to the drawings in detail, wherein for the purpose of illustration, there is disclosed a preferred embodiment of the present invention, the numeral 10 represents an outer clamping member constructed from a single blank of sheet metal and formed with a horizontal downwardly facing clamp portion or split sleeve 12, a pair of downwardly and outwardly extending diverging concavo-convex seat portions 14 and 16, and a pair of spaced walls 18 and 20 integrally formed with and connecting the seat portions 14 and 16 to the clamp portion 12.

The blank forming the clamping member 10 is provided with a slit 22 defining a dividing line between the concavo-convex seat portions 14 and 16. These edges of the seat portions 14 and 16 are formed with ears 24 and 26 that overlap each other and which are secured in overlapping relationship by fasteners, such as rivets 28.

The central portion 30 of a substantially U-shaped inner clamping member 32 is secured against the overlapping parts of the seat portions 14 and 16, and more specifically against ear 24, by the fasteners 28 as the ears 24 and 26 are secured together. The concavo-convex leg portions 34 and 36 of the member 32 extend transversely across the seat portions 14 and 16 with the concaved surfaces of portions 34 and 36 facing the concave surfaces of seat portions 14 and 16, as shown best in Figure 6.

Leg portions 34 and 36 terminate in fastening ears 38 and 40 having apertures that register with apertures in the walls 18 and 20. Bolts 42 and 44 are extended through the apertures in walls 18 and 20 in registry with the ears 38 and 40, and through the apertures in the ears 38 and 40, and carry nuts 46 and 48 which may be tightened to clamp structural elements E and E' between the seat portions 14, 16 and the leg portions 34, 36.

Strengthening bosses 50 and 52 are pressed outwardly from the member 10 at the junctures of clamp portion 12 with walls 18 and 20. These bosses are formed with registering apertures that accommodate bolts 54 having nuts 56 threaded thereon. The nuts 56 are tightened in order to contract and clamp the portion 12 about one end of a structural element E".

Detents 58 and 60 are pressed inwardly from the upper ends of the seat portions 14 and 16 adjacent clamp portions 12 to engage the upper ends of the elements E and E' and prevent the same from engaging the structural element E" gripped by clamp portion 12.

The invention thus described is capable of connecting and joining three structural elements E, E' and E", of a suitable frame structure, due to the combined gripping actions of the inner and outer clamping members 10 and 32 and the gripping action of the clamp portion 12 forming part of the outer clamping member 10.

In practical use, it is merely necessary to insert the upper ends of the structural members E and E' upwardly between the seat portions 14, 16 and leg portions 34, 36 and tighten the bolts 44 in order to clamp the structural elements E and E' between the clamping members 10 and 32. Then, one end of a horizontal structural element E" is inserted in the clamp portion 12 and the nuts 56 are tightened in order to clampingly secure the structural element E" within the clamp portion 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A metal joint and clamp comprising inner and outer clamping members, said outer clamping member including a horizontal clamp portion and a pair of downwardly diverging concavo-convex seat portions formed with the clamp portion, said inner clamping member being secured to said outer clamping member and having a pair of concavo-convex end portions facing the seat portions, and means adjustably securing the end portions of said inner member to said outer member to selectively move the concavo-convex end portions toward said seat portions, said seat portions having edges overlapping each other, and fasteners securing said overlapping edges together and to the inner clamping member.

2. A metal joint and clamp comprising inner and outer clamping members each of which is constructed from sheet metal, said outer member including a horizontal clamp portion, a pair of diverging concavo-convex seat portions extending downwardly from said clamp portion and a pair of spaced walls connecting the clamp portion to the seat portions, fasteners joining said walls and permitting the clamp portion to be contracted about a structural element, said inner clamping member having a pair of concavo-convex end portions facing said seat portions, and fasteners securing said end portions to said walls to clamp structural elements in said seat portions, said seat portions having edges overlapping each other, and fasteners securing said overlapping edges together and to the inner clamping member.

References Cited in the file of this patent

UNITED STATES PATENTS

| | | |
|---|---|---|
| 1,150,781 | Louden | Aug. 17, 1915 |
| 1,263,249 | Hoppes | Apr. 16, 1918 |
| 1,264,227 | Uhl | Apr. 30, 1918 |
| 1,876,787 | Strand | Sept. 13, 1932 |
| 2,112,778 | Kacena | Mar. 29, 1938 |
| 2,317,444 | Dalton | Apr. 27, 1943 |
| 2,473,217 | Peoples | June 14, 1949 |
| 2,618,788 | Cole et al. | Nov. 25, 1952 |

FOREIGN PATENTS

| | | |
|---|---|---|
| 671,520 | France | Sept. 2, 1929 |